United States Patent
Zheng et al.

(10) Patent No.: US 10,296,530 B2
(45) Date of Patent: May 21, 2019

(54) IDENTIFYING ENTITY REPRESENTATIVES FOR TOPICS REFLECTED IN CONTENT ITEMS USING NATURAL LANGUAGE PROCESSING

(71) Applicant: Microsoft Technology Licensing, LLC, Redmond, WA (US)

(72) Inventors: Yi Zheng, Sunnyvale, CA (US); Chi-Yi Kuan, Fremont, CA (US); Hu Wang, Mountain View, CA (US); Rui Zhao, Mountain View, CA (US); Yongzheng Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/252,159

(22) Filed: Aug. 30, 2016

(65) Prior Publication Data
US 2018/0060423 A1    Mar. 1, 2018

(51) Int. Cl.
*G06F 17/30*   (2006.01)
*G06F 16/35*   (2019.01)
*G06F 16/36*   (2019.01)

(52) U.S. Cl.
CPC ............ *G06F 16/353* (2019.01); *G06F 16/36* (2019.01)

(58) Field of Classification Search
CPC ........... G06F 17/30616; G06F 17/3064; G06F 17/30684; G06F 17/30696; G06F 17/3071; G06F 17/30705; G06F 17/30707; G06F 17/30864; G06F 16/353; G06F 16/36; G06Q 10/10; G06Q 10/0639; G06Q 10/06393; G06Q 10/06395; G06Q 30/02; G06Q 30/0201; G06Q 50/01
USPC ....... 707/736, 737, 738, 748, 749, 758, 767; 705/7.29, 7.32, 7.38, 7.39, 7.41, 26.7, 319
See application file for complete search history.

(56) References Cited

U.S. PATENT DOCUMENTS

| | | | |
|---|---|---|---|
| 9,563,693 B2 * | 2/2017 | Zhang | G06F 17/30684 |
| 2012/0233258 A1 * | 9/2012 | Vijayaraghavan | G06Q 50/01 709/204 |
| 2013/0018957 A1 * | 1/2013 | Parnaby | G06Q 10/10 709/204 |
| 2016/0092576 A1 * | 3/2016 | Quercia | G06F 17/30867 707/734 |
| 2016/0147893 A1 * | 5/2016 | Mashiach | G06F 17/30867 707/710 |
| 2016/0328480 A1 * | 11/2016 | Owens | G06F 17/30867 |

* cited by examiner

*Primary Examiner* — Greta L Robinson
(74) *Attorney, Agent, or Firm* — Hickman Palermo Becker Bingham LLP

(57) ABSTRACT

A topical representative assessment system implements techniques for determining entities that are ambassadors for one or more topics. The ambassadors are determined based on content items that they have authored or content items that are otherwise attributed to them. An ambassador may be any type of entity such as a person, a company, or an organization. Machine analytics may be used to determine whether a content item corresponds to a specific topic, determine a sentiment for a content item, analyze feedback for a content item, or any combination of these.

20 Claims, 4 Drawing Sheets

IDENTIFYING ENTITY REPRESENTATIVES FOR TOPICS REFLECTED IN CONTENT ITEMS USING NATURAL LANGUAGE PROCESSING

TECHNICAL FIELD

The present disclosure relates to grouping content items and, more specifically, grouping content items according to topics or main ideas expressed in the content items. SUGGESTED GROUP ART UNIT: 2126; SUGGESTED CLASSIFICATION: 707/738.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Internet provides a wealth of information, making it easy for users to research information on any topic they are interested in. Some examples of topics may include a product, a hobby, an interest, an organization, a cause, a feature, or many other topics. However, with the sheer number of content items available on the Internet, it has become difficult for users to determine what information has the highest quality and where to get this information. To do this, many users turn to sources of information they trust (such as user-generated content items from specific persons or professionally-produced content items) for their information.

It is difficult to identify which sources of information are trusted or of higher quality than others for a given topic. This makes it difficult to reach out to these influential sources of information, best situated to get new information on the given topic out. For example, a promoter for a new feature on a Website wants to publicize the new feature so that more people will try the new feature. The promoter may use untargeted methods, such as including an announcement on a homepage of the Website, to announce the new feature. This announcement may be of limited effectiveness, since many users of the Website may ignore this information since it did not originate from their trusted sources.

Therefore, there is a need to identify trusted sources as ambassadors for topics, so that entities that provide the highest quality of information may be discovered.

DETAILED DESCRIPTION

Figure 1:
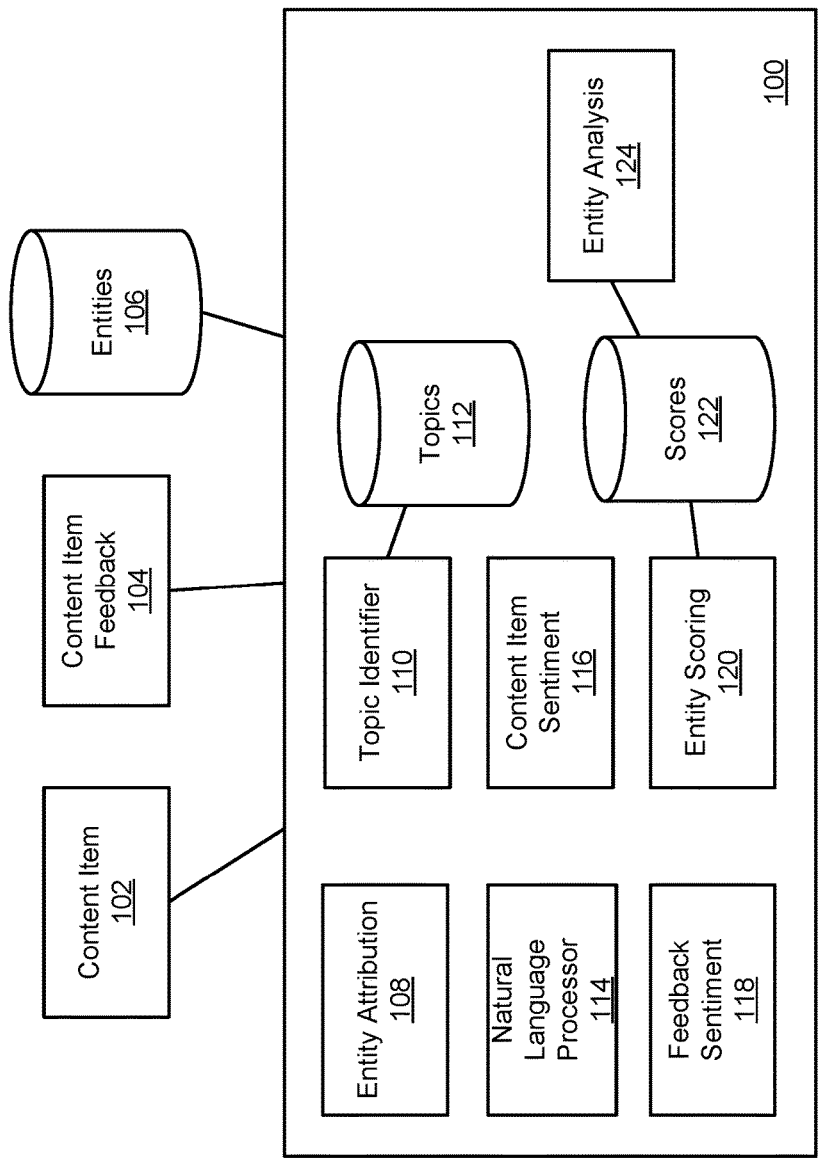
FIG. 1 illustrates a topical representative assessment system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the context of working with a data center management system, used together with a content item exchange. However, it is understood that a content item exchange is only a specific type of system, of which there are others, which may support the data center management system.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

1.0 GENERAL OVERVIEW
   1.1 SAMPLE USE CASE: SOCIAL NETWORKING ENVIRONMENT
   1.2 SAMPLE USE CASE: SOCIAL PRODUCT MARKETPLACE ENVIRONMENT
2.0 STRUCTURAL OVERVIEW
3.0 EXAMPLE METHOD FOR DETERMINING SENTIMENT FOR CONTENT ITEMS
   3.1 TOPIC SELECTION
   3.2 CONTENT ITEM SELECTION
   3.3 DETERMINE WHETHER A SELECTED CONTENT ITEM IS ASSOCIATED WITH A TOPIC
   3.4 DETERMINE AUTHORING ENTITY
   3.5 DETERMINE A SENTIMENT FOR THE TOPIC
4.0 EXAMPLE METHOD FOR DETERMINING LEVEL OF ENGAGEMENT FOR CONTENT ITEMS
   4.1 RECEIVE FEEDBACK FOR CONTENT ITEM
   4.2 DETERMINE SENTIMENT FOR FEEDBACK ITEM
   4.3 DETERMINE STRENGTH OF FEEDBACK ITEM
   4.4 DETERMINE AMBASSADOR SCORE
   4.5 PERFORM ANALYTICS USING AMBASSADOR SCORE
5.0 IMPLEMENTATION EXAMPLE—HARDWARE OVERVIEW 1.0 General Overview A topical representative assessment system is described herein which implements techniques for determining entities that are ambassadors for one or more topics. A topic may include a product (e.g., toy, food, computer, mobile phone), a hobby (e.g., hiking, cooking, home improvement), an organization (e.g., AMERICAN RED CROSS, WWF), a cause, a feature (e.g., a Website feature, an application feature), or many other topics.

The ambassadors are determined based on content items that they have authored or content items that are otherwise attributed to them. An ambassador may be any type of entity, such as a person, a group, a company, or an organization. Machine analytics may be used to determine whether a content item corresponds to a specific topic, determine a sentiment for a content item, analyze feedback for a content item, or any combination of these.

The following presents some sample use cases of the topical representative assessment system. Although the specification may employ examples using one or more of the sample embodiments discussed below, the principles as described herein are generally applicable to other types of systems where there is a need for determining ambassadors for topics.

1.1 Sample Use Case: Social Networking Environment

In an embodiment, the topical representative assessment system is used in a social networking environment. For example, a social network may include members whom are talking about the social network and other topics of interest to the members. This may result in a large amount of member-authored content items that other members (or non-members) may view and upon which the other members may leave feedback. Using feedback items for the content items, the topical representative assessment system may determine that some of the members are authors of the content items and are ambassadors of the specific topic they discuss in their authored content item. For example, the authors may be ambassadors for the social network itself, specific products of the social network, or of other topics not related to the social network.

The topical representative assessment system may take into account feedback using various engagement metrics (e.g., shares, likes, comments), as well as content extracted from the content items themselves. This may be used to determine a level of engagement for the content items. For example, if the content item includes text, then the topical representative assessment system may use natural language processing (or NLP) techniques to understand what the content item describes. With information determined by the topical representative assessment system, the social network may help build stronger brand affiliation with the social network, which supports the social network's marketing, product personalization, and monetization efforts. Further, trends may be determined from social media discussions around the social network's brand and value proposition.

1.2 Sample Use Case: Social Product Marketplace Environment

In an embodiment, the topical representative assessment system is used in a product marketplace environment. For example, a product marketplace may be an online marketplace where goods, products, or services (or other types of items) are sold or traded. Users of the product marketplace may leave content items, such as a review, of one or more items on the product marketplace. The content items (or reviews) are rated based on whether they are positive or negative towards the selected good, product, or service. Further, based on feedback for the content items from other users, a level of engagement is determined. The level of engagement is used when determining whether the user would be an active ambassador for the good, product, or service to which the content item pertains.

2.0 Structural Overview

FIG. 1 illustrates a topical representative assessment system 100 in which the techniques described may be practiced according to certain embodiments. The topical representative assessment system 100 is a computer-based system. The various components of the topical representative assessment system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The topical representative assessment system 100 illustrates only one of many possible arrangements of components configured to perform the functionality described herein. Other arrangements may include fewer or different components, and the division of work between the components may vary depending on the arrangement.

The topical representative assessment system 100 receives input from a content item system 102, a content item feedback system 104, and an entities data store 106. The content item system 102 may include various pieces of content items. Some examples of content items may include posts, articles, emails, public messages, and many other types of content items. A content item may include different pieces of information used by the topical representative assessment system 100. For example, a content item may include an author, a tag, a theme, a text, a body, or any combination of these.

The content item feedback system 104 allows entities, such as users of a social networking website, to leave feedback on a particular content item. The feedback is then associated with (or linked to) the particular content item. The particular content item may be hosted by one system, while the feedback on the particular content item be hosted by another system or the content item feedback system 104 and the content item system 102 may exist on the same system.

The entities data store 106 may include various pieces of information on authors of content items stored in the content item system 102. The pieces of information may include names of different entities, a list of various content items the entities have authored, a source where the entity's content items are listed or found, and other pieces of information. The entities data store 106 may include users for a particular social network, as well as other entities that are not users of the particular social network.

The topical representative assessment system 100 includes an entity attribution component 108 that determines, based on a content item received from the content item system 102, which entity listed in the entities data store 106 has authored the content item. For example, a post may include an author section of the post, which specifies an entity that authored the post.

A topic identifier component 110 is responsible for identifying what topics are included in a content item. A content item may include one or more topics. A listing of topics is maintained in a topics data store 112. Not all topics of the topic data store will be applicable when determining which topics are included in a particular content item. When the topic identifier component 110 identifies one or more topics that are discussed in the content item, these topics may be a subset of the topics stored in the topics data store 112.

A topic may be specified using metadata or be determined using analysis of what is included in a particular content item. For example, if a content item is a text-based content item, then a natural language processor component 114 may analyze words used in a body or title portion of the content item to determine which topics are discussed. The natural language processor component 114 may also include functionality to understand a content item other than content items in text. For example, audio or picture analysis may be used by the natural language processor component 114 to interpret content of video, audio, and picture content item types.

A content item sentiment component 116 is responsible for determining what sentiment a content item has for a given topic. The sentiment for a content item may include a positive, a negative, a neutral, or any variation in intensity of these sentiments. For example, a content item may be neutral towards a first topic, yet positive towards a second topic. The natural language processor component 114 may be used to analyze content of the content item. For example, positive words, such as "great," "helpful," and "user-friendly," that are used to describe a topic indicate a positive sentiment while negative words, such as "difficult," "poor," "clunky," and "slow," that are used to describe a topic indicate a negative sentiment.

A feedback sentiment component 118 is responsible for determining a sentiment for a feedback item, such as feedback items provided by the content item feedback system 104. The sentiment for a feedback item may include a positive, a negative, a neutral, or any variation in intensity of these sentiments. The natural language processor component 114 may be used to analyze content of the feedback item. Alternatively, feedback items may indicate by themselves the sentiment of the feedback item. For example, a feedback item using a dislike button would indicate a negative sentiment, while a feedback item using a like button would indicate a positive sentiment.

An entity scoring component 120 is responsible for determining scores for authoring entities and storing the scores in a scores data store 122. For example, scores for an entity may include one or more feedback items for one or more topics. These scores are stored in the scores data store 122.

An entity analysis 124 is responsible for performing analytics on scores stored in the scores data store 122.

Figure 2:
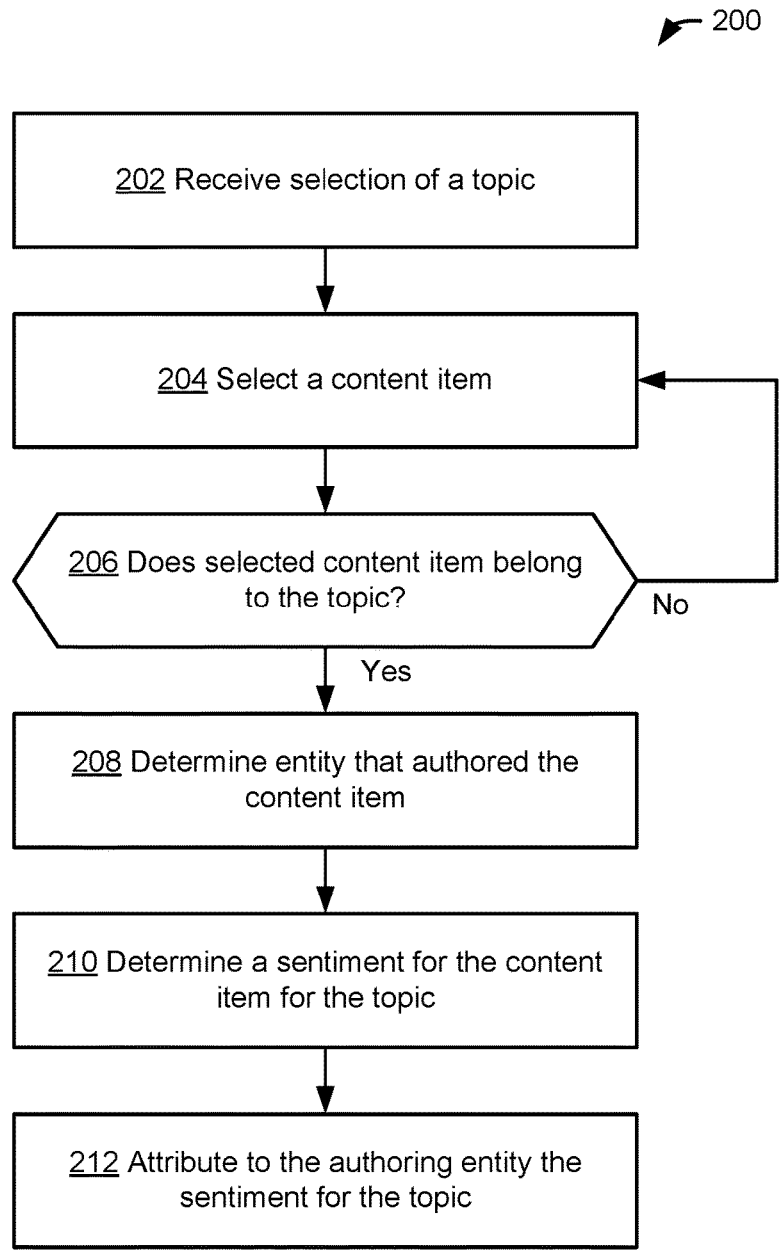
FIG. 2 is a flow that illustrates an example method of determining sentiment for content items in the topical representative assessment system.
Figure 3:
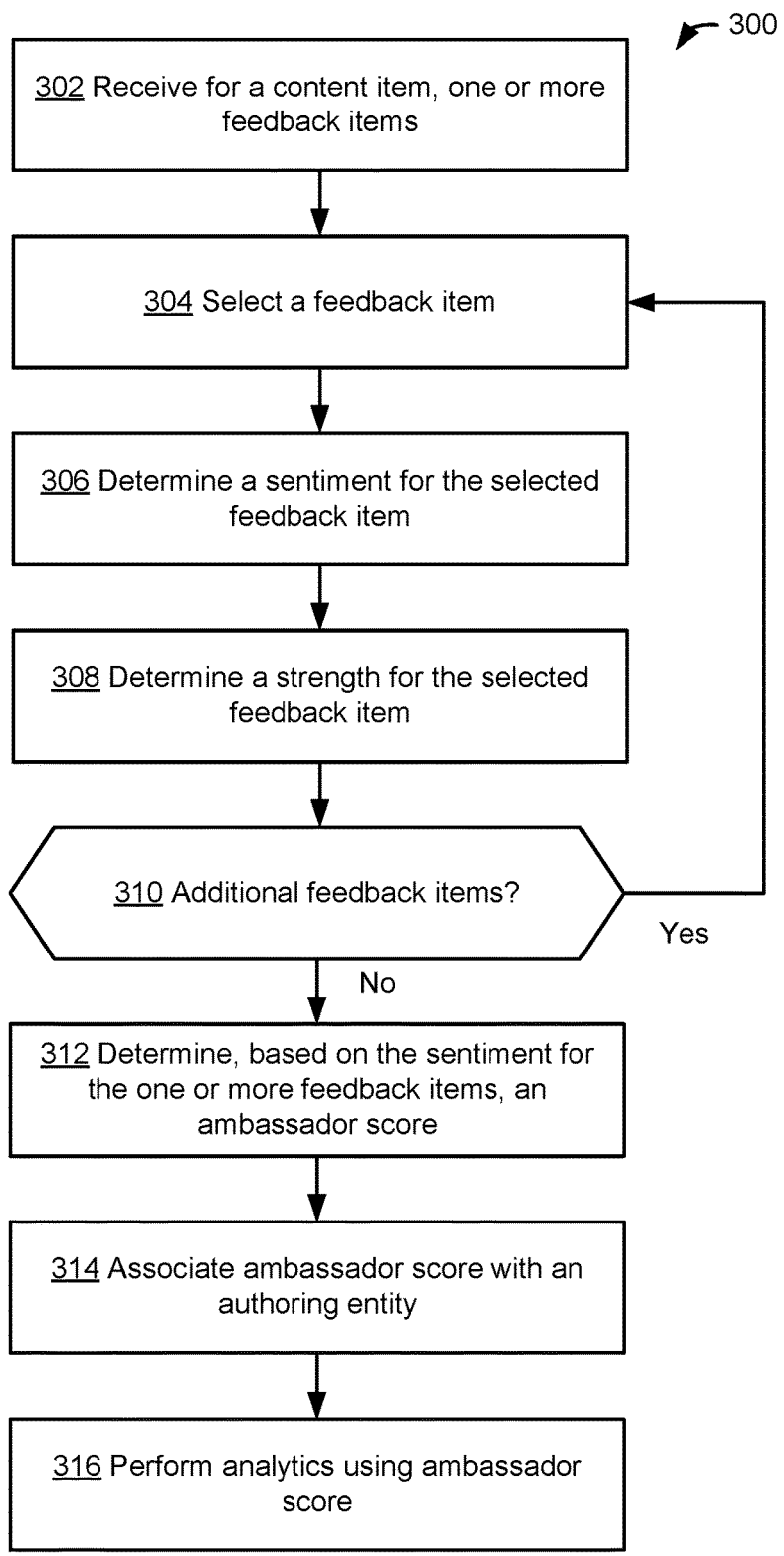
FIG. 3 is a flow that illustrates an example method of determining a level of engagement for a content item in the topical representative assessment system.

For purposes of illustrating a clear example, FIGS. 2 and 3 are described herein in the context of FIG. 1, but the broad principles of FIGS. 2 and 3 can be applied to other systems having configurations other than as shown in FIG. 1. Further, FIGS. 2 and 3 illustrate an algorithm or plan that may be used as a basis for programming one or more of the components of FIG. 1 that relate to the functions that are illustrated in the diagram, using a programming development environment or programming language that is deemed suitable for the task. Thus, FIGS. 2 and 3 are intended as an illustration at the functional level at which skilled persons, in the art to which this disclosure pertains, communicate with one another to describe and implement algorithms using programming. This diagram is not intended to illustrate every instruction, method object, or sub step that would be needed to program every aspect of a working program, but are provided at the high, functional level of illustration that is normally used at the high level of skill in this art to communicate the basis of developing working programs.

3.0 Example Method for Determining Sentiment for Content Items

FIG. 2 is a flow 200 that illustrates an example method of determining sentiment for content items in the topical representative assessment system 100.

3.1 Topic Selection

In step 202, the topical representative assessment system 100 receives a selection of a topic. For example, a topic may be a product, a hobby, an interest, an organization, a cause, or many other different topics. For example, system 100 presents a text entry field into which a user enters text indicating a topic. Alternatively, the selected topic may be a pre-selected topic, meaning that the topic is known before content items are analyzed by the topical representative assessment system 100. For example, the topical representative assessment system 100 is programmed to only look for certain topics. Alternatively, the topical representative assessment system 100 is able to identify practically any topic within one or more content items, such that user input or pre-programmed topics are not required in order to identify a topic.

In an embodiment, the topical representative assessment system 100 receives more than one topic. For example, multiple topics may be considered when determining whether an entity is a good ambassador for a particular topic, based on their authored content items.

3.2 Content Item Selection

In step 204, the topical representative assessment system 100 selects a content item for analysis. The selected content item may be of different content item types (e.g., text, image, video, or other). The selected content item may be from one or more different sources and include one or more authors. Some examples of different sources include content items from various services or information providers. For example, the content item may be from a social network, a news provider, a forum, or many other sources.

Embodiments of the topical representative assessment system 100 may include content items from sources that are internal, external, or mixed from an organization that hosts, manages, or operates the topical representative assessment system 100. For example, in the embodiment where the topical representative assessment system 100 operates with a social network, the content item may be an article or other post written by an author and posted onto the social network. The content item may be posted directly onto the social network (e.g., authored and posted onto the social network using tools provided by the social network) or indirectly through a link (e.g., a hyperlink to a content item hosted by a third-party Website). The topical representative assessment system 100 may also include additional content items, from sources external to the social network. For example, a partner Website or content aggregator may provide content items for the topical representative assessment system 100 to analyze, such as Facebook™ and Twitter™.

3.3 Determine Whether a Selected Content Item is Associated with a Topic

In step 206, the topical representative assessment system 100 determines whether the content item is associated with the topic. For example, the selected content item may discuss one or more topics. The topical representative assessment system 100 may determine whether the selected content item discusses the selected topic from step 202 by analyzing the selected content item.

In an embodiment, the topical representative assessment system 100 may employ fuzzy logic or other techniques to catch different variations of spelling or different ways to express the selected topic (e.g., different names, code names) in determining whether the selected content item belongs to the selected topic.

As an example, fuzzy logic may be used to determine that a user's content item is associated with a topic of "messneger" as a result of the user misspelling the word messenger. A direct comparison of "messneger" to known topics in the topical representative assessment system 100 may result in no results. However, using fuzzy logic, the topical representative assessment system 100 may determine that "messneger" relates to the messenger topic and the user properly associated with the messenger topic, even though the word messenger may not appear in the user's content item.

As another example, fuzzy logic may be used to determine that a user's content item is associated with a topic of LinkedIn™'s mobile application, even when the codename for the application was used. Particularly for ambassadors, they may keep on the cutting edge of developments of technology and prefer to use codenames to refer to the latest projects. For example, the Project Voyager version of the LinkedIn™ mobile application was released in early 2016. Using fuzzy logic, the topical representative assessment system 100 may determine that "Project Voyager" relates to the latest version of the application and the user properly associated with the LinkedIn™ mobile application topic.

In an embodiment, the topical representative assessment system 100 includes a threshold relevance analysis feature to determine whether a content item includes sufficient material associated with a specific topic. A content item may briefly discuss a topic, but without sufficient detail to warrant the content item to be associated with the topic. If the content item includes insufficient material and falls below the threshold, then the content item is determined to not belong to the topic. If the content item includes sufficient material to meet the threshold, then the content item is determined to be associated with the selected topic.

3.4 Determine Authoring Entity

In step 208, the topical representative assessment system 100 determines an entity that authored the selected content item (that is associated with a selected topic). Oftentimes, the entity that authored the content item will be a person, but groups and organizations (e.g., magazines, Websites, newspapers, trade journals) may also qualify as an authoring entity. The authoring entity may be specified as part of the content item itself (e.g., as part of a byline), or as metadata included with the content item.

3.5 Determine a Sentiment for the Topic

In step 210, the topical representative assessment system 100 determines a sentiment for the content item in the specified topic. For example, if the content item is a text based content item, then natural language processing techniques may be used to determine a sentiment for the content item. Some examples of sentiment may be a positive sentiment, a negative sentiment, or a neutral sentiment. An example of natural language processing techniques that may be used are discussed in U.S. application Ser. No. 14/807,677, filed Jul. 23, 2015, the entire contents of which are hereby incorporated by reference for all purposes as if fully set forth herein.

In an embodiment, the topical representative assessment system 100 uses natural language processing techniques on a content item to determine a sentiment in a particular topic for the content item. The content item may include freeform, unstructured data, which may preclude efficient and/or effective manual review of the content item by human reviewers. The topical representative assessment system 100 may automatically extract a set of clauses in the content item and compare the clauses to known topics, such as those stored in the topics data store 112. For example, for text data in the content item, connective words and/or punctuation marks between adjacent groups of text in the content item may indicate where a clause begins or ends. A statistical model may be applied to classify the sentiment of each clause and its respective topic. To determine the sentiment for a clause, the topical representative assessment system 100 may search for words that are related to sentiment. For example, words such as "dislike," "unusable," and "difficult" in the clause may indicate a negative sentiment. On the other hand, words such as "like," "user-friendly," and "easy" in the clause may indicate a positive sentiment.

In addition to determining sentiment for clauses, for a particular clause, the statistical model may consider the particular clause or surrounding clauses to determine the sentiment for a topic in the particular clause. The statistical model may determine how different connective words or punctuation marks may affect how related different clauses are. As an example, if a particular clause is on a profile feature topic, a new paragraph marker may provide an indication that the profile feature topic is likely unrelated to a sentiment discussed after the new paragraph marker. On the other hand, a comma between the particular clause including the profile feature topic and the next clause may provide an indication that a sentiment discussed in the next clause is likely related to the profile feature topic.

A content item may be directed towards more than one topic, and it may be possible for a single content item to include topics with different sentiments. For example, if an article discusses a search feature and a profiling feature of a social network as topics, it may be possible for the article to be positive on the search feature (e.g., improvement in the accuracy of searches), while neutral on the profiling feature (e.g., provides more information but is difficult to understand).

In various embodiments, the topical representative assessment system 100 may use content items of different types other than text. Other types of content items, such as picture, video, or audio, may be used by the topical representative assessment system 100. For example, when the content item includes audio, the topical representative assessment system 100 may use audio processing to determine a sentiment expressed in the audio by using audio voice-recognition techniques. In another example, when the content item includes video, the topical representative assessment system 100 may use audio and visual recognition techniques to determine a sentiment.

In an embodiment, the topical representative assessment system 100 includes determining whether a content item includes sufficient material to determine a sentiment. For example, if a content item is a text based content item, then the text must be of sufficient length to determine a sentiment of the content item towards the selected topic. This may be determined by an absolute number of words used in the text, number of words used when discussing the topic, or other metric. If there is insufficient material to determine a sentiment for a topic in a given content item, then the content item may still be relevant for other topics.

In step 212, the topical representative assessment system 100 attributes to the authoring entity the sentiment for the topic. For example, the topical representative assessment system 100 may store, for each of one or more topics, sentiments for the authoring entity.

4.0 Example Method for Determining Level of Engagement for Content Items

FIG. 3 is a flow 300 that illustrates an example method of determining a level of engagement for a content item in the topical representative assessment system 100.

4.1 Receive Feedback for Content Item

In step 302, the topical representative assessment system 100 receives, for a content item, one or more feedback items. Feedback items are generally content item specific. This means that each feedback item is associated with one content item. Persons who have viewed the associated content item and then decided to leave a comment generally provide feedback items. In the embodiment where the topical representative assessment system 100 operates with a social networking Website, the content item may be a post posted to the social networking Website. The post may include one or more feedback items, from users of the social networking Website or other viewers of the content item that are not users of the social networking Website. Some examples of feedback may be a like/dislike button selection, a page view, a text feedback item, an image feedback item, a video feedback item, or any other type of feedback.

In an embodiment, entities that provide feedback items for a content item are different than an authoring entity for the content item. The topical representative assessment system 100 may ignore feedback items that are authored by the same entity as a content item. For example, an author of a content item may provide clarifications to their content item after reviewing feedback items from users. However, to prevent unnecessary counting of the author's feedback item as part of the authoring entity's ambassador score, the feedback item by the authoring entity is ignored.

4.2 Determine Sentiment for Feedback Item

In step 304, the topical representative assessment system 100 selects a feedback item of the one or more feedback items. In step 306, for each feedback item, the topical representative assessment system 100 determines a sentiment for the feedback item. Different methods may be used to determine the sentiment depending on what kind of feedback item is received. As one example, where the feedback item is a like/dislike button, the like button may indicate a positive sentiment while the dislike button may indicate a negative sentiment. As another example, where the feedback item is a text feedback item, NLP techniques may be used to determine the sentiment.

A non-exhaustive list of factors the topical representative assessment system 100 may use to determine a sentiment for a feedback item include:

Impressions: number of times the content item is transmitted to viewers;

Clicks: number of clicks for the content item by viewers;

Likes: number of times people have used a like button indicator for the content item;

Comments: number of times people have commented on the content item;

Shares: number of times people have shared the content item; or

Any combination of these factors.

4.3 Determine Strength of Feedback Item

In step 308, the topical representative assessment system 100 determines a strength score for the selected feedback item. Different metrics may be used to determine the strength score of the selected feedback item based on the availability of various pieces of information for the feedback item. For a social networking Website, pieces of information associated with the feedback author such as seniority, number of connections, quality of connections, or segment strength may be used. For example, a person who is more senior that offers a feedback item may be stronger in strength score than another person who lacks seniority. As another example, a person who has a higher strength in a segment (e.g., technology, financial analysis, or other segments) may include a higher strength score for their feedback than others, if the segment is related to the topic associated with a content item.

In step 310, the topical representative assessment system 100 determines whether there are additional feedback items for the content item. All of the feedback items or a subset of the feedback items for the content item may be used to determine the strength of the feedback item.

In an embodiment, the topical representative assessment system 100 calculates a level of engagement according to Equation 1 as presented below.

$$ES = \sum_k W_k A_k \quad \text{Equation 1}$$

where ES represents an engagement score (or level) for a content item, W represents a weight coefficient of action type k (e.g., impressions, clicks, shares, comments, etc.), and A represents a number of occurrences of action type k. The ES may be normalized for easier interpretation.

4.4 Determine Ambassador Score

In step 312, the topical representative assessment system 100 determines, based on the sentiment for the one or more feedback items, an ambassador score for an authoring entity based on the content item. Different scales may be used to represent the ambassador score. The scale used to represent the ambassador score may be consistent with ambassador scores for other entities. For example, a numerical scale (e.g., 0 to 100, 1 to 10), an alphabetical scale (e.g., A to F, A to Z), or other scale may be used. If the 0 to 100 scale is used, all entities associated with an ambassador score will also use the 1 to 100 scale. In an embodiment, the topical representative assessment system 100 may include a convertible scale so that different scales may be used according to a particular use case for the ambassador score. For example, although greater granularity in the ambassador score may be necessary in certain applications of the ambassador score, other applications may use a simplified A to F scale.

In an embodiment, the representative assessment system 100 determines an ambassador score for an entity, based on more than one content item and its respective feedback items. Although the flow 300 illustrates an example of determining an ambassador score using feedback items for a single content item, additional content items may be considered by repeating steps 302, 304, 306, 308, and 310 for each content item. An additional step, not shown in FIG. 3, may include combining results of the determined ambassador score that is specific for each content item to produce an ambassador score for an entity, across more than one content item.

In step 314, the topical representative assessment system 100 associates the ambassador score with the authoring entity of the content item. Any suitable data storage method that allows the indexing of entity information with the ambassador score may be used.

In an embodiment, additional information associated with an ambassador score is stored with the ambassador score for an entity. Some examples may be a time when the ambassador score is calculated, information used to determine an ambassador score, and many other pieces of information.

In an embodiment, the topical representative assessment system 100 calculates an ambassador score according to Equation 2 as presented below.

$$A = \sum_j I_j ES_j \quad \text{Equation 2}$$

where $I_j$ represents an indicator function of content metrics for the content items j. The indicator function maps content item j to a specified topic. For example, to determine an ambassador score for an authoring entity in a specified topic X, the indicator function will return 1 if the content item j belongs to the specified topic X and return 0 if the content item j does not belong to the specified topic X. The content items j may be time limited, so that only content items by members within a certain time window (e.g., 1 day, 1 week, or 1 month) are used when determining the ambassador score.

4.5 Perform Analytics Using Ambassador Score

In step 316, the topical representative assessment system 100 performs analytics using the ambassador score. A non-exhaustive list of potential uses of the ambassador score include:

Ambassador Investigation. Displaying on a visual display one or more entities ranked by their respective ambassador scores. This allows an investigation into which entities are the best ambassadors, as well as providing a way to compare and contrast the strengths of one potential ambassador with another. In an embodiment, the topical representative assessment system 100 allows sorting of entity and ambassador information according to various filters. Some of these filters may include:

Verified accounts (e.g., accounts where the entity is verified to be the actual entity);

Seniority;

Industry;

Educational background;

Employee;

Freelancer or professionals; or

Any combination of these.

Automatic Contact Ambassadors. If an entity exceeds a threshold ambassador score, then the topical representative assessment system 100 may automatically notify (e.g., through e-mail, system message, Web page display) to the entity that they have become an ambassador for a given topic. This recognition may further increase engagement by the entity in the given topic, and encourage the entity to engage in additional activities to promote their ambassador score for additional topics.

Tag or Other Indication. If an entity exceeds a threshold ambassador score, then the topical representative assessment system 100 may include a tag or other indication with the entity's profile. The tag or other indication may be a private indication (e.g., shown only to users with access to the topical representative assessment system 100 or to the entity herself).

Updates for Developments in Topic. If an entity exceeds a threshold ambassador score, then the topical representative assessment system 100 may transmit, to the entity, updates pertaining to a topic. As one example, if an entity is an ambassador in a messaging feature, then updates to the messaging feature may automatically transmit a message to the entity, so that the entity is kept appraised of updates.

Trend Analysis. If an entity exceeds a threshold ambassador score, then the topical representative assessment system 100 may provide trend information for a topic, based on the entity. For example, if the entity shows greater interest in the topic (e.g., producing more content items), then the topical representative assessment system 100 may predict that this means the topic may be gaining in importance to other entities that are related (e.g., followers of the entity, other ambassadors of similar topics).

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
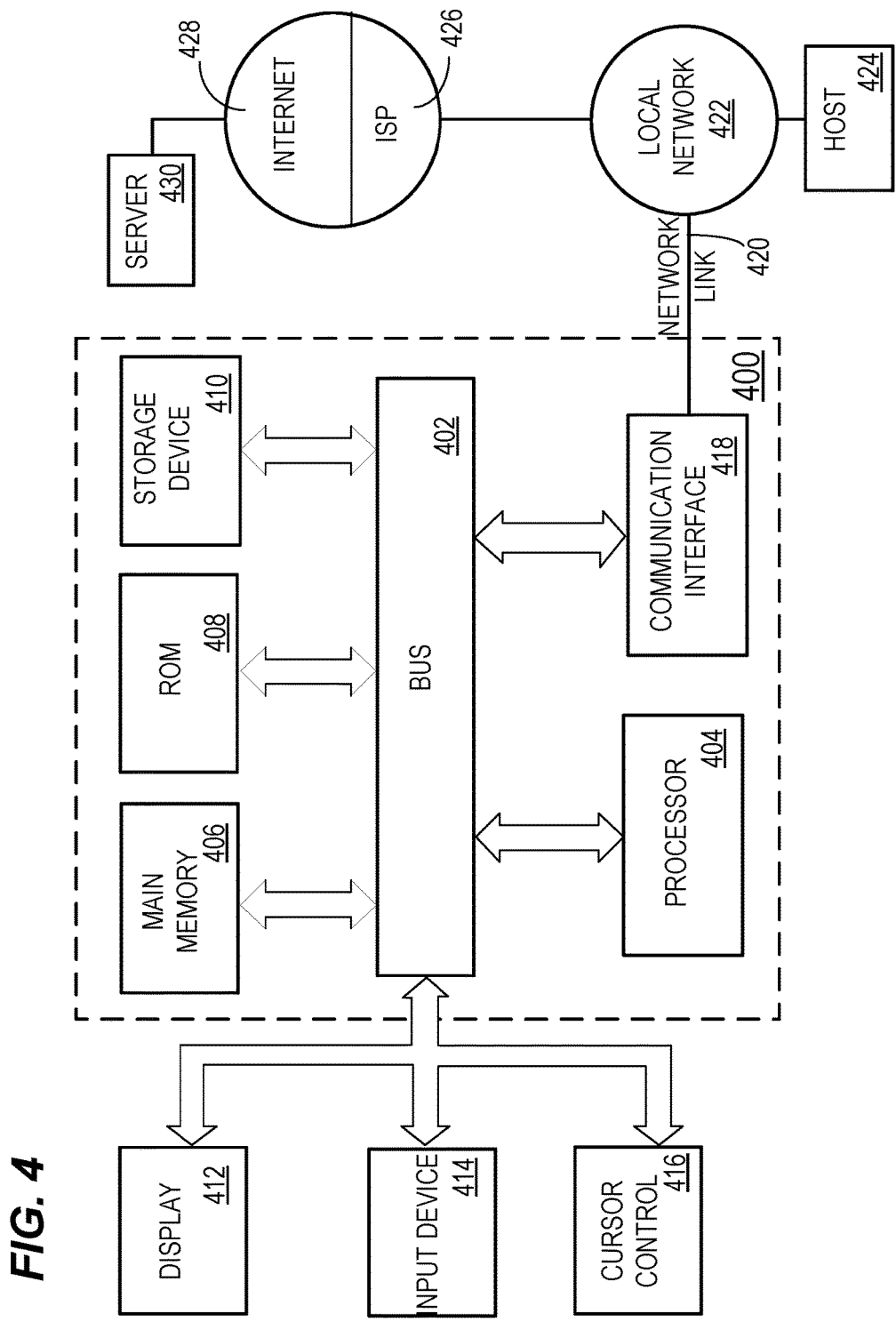
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   receiving a selection of a first topic to which a content item may pertain;
   for each entity of a first plurality of entities:
   identifying one or more content items that were authored by said each entity and that corresponds to the first topic;
   for each content item in the one or more content items:
   generating a value that indicates sentiment of said each entity relative to the first topic;
   determining a level of engagement of said each content item by a second plurality of entities;
   based on the value and the level of engagement, generating an ambassador score for said each entity in the first plurality of entities.

2. The system of claim 1, wherein the one or more storage media storing instructions which, when executed by the one or more processors, further cause:
   generating, based on the ambassador score for each said each entity in the first plurality of entities, a ranking of the first plurality of entities;
   displaying, on a computer device, the ranking of the first plurality of entities.

3. The system of claim 1, wherein determining the level of engagement comprises:
   for a plurality of feedback associated with each said each content item, determining the feedback comprises a text portion;
   for each feedback of the plurality of feedback, analyzing the text portion of said feedback to determine whether the text portion corresponds to at least one of a positive feedback indicator, a negative feedback indicator, or a neutral feedback indicator;
   determining the level of engagement based at least in part on the determined positive feedback indicator, negative feedback indicator, or the neutral feedback indicator for each feedback of the plurality of feedback.

4. The system of claim 1, wherein determining the level of engagement comprises:
   for a plurality of feedback associated with each said each content item, determining the level of engagement based at least in part on a number of feedback of the plurality of feedback.

5. The system of claim 1, wherein determining the level of engagement comprises:
   for a plurality of feedback associated with each said each content item, determining the level of engagement based at least in part on whether a feedback indicator comprises a positive feedback indicator or a negative feedback indicator.

6. The system of claim 1, wherein the receiving the selection of the first topic occurs before identifying the one or more content items.

7. The system of claim 1, wherein the one or more storage media storing instructions which, when executed by the one or more processors, further cause:
receiving a selection of a second topic to which a content item may pertain;
for each entity of the first plurality of entities:
identifying one or more second content items that were authored by said each entity and that corresponds to the second topic that is different than the first topic;
for each content item in the one or more second content items:
generating another value that indicates sentiment of said each entity relative to the second topic;
determining another level of engagement of said each content item by a third plurality of entities that is different than the second plurality of entities;
based on the other value and the other level of engagement, generating another score for said each entity in the first plurality of entities.

8. The system of claim 7, wherein a first content item corresponds to the first topic and the second topic.

9. The system of claim 1, wherein determining the level of engagement comprises:
determining, for a particular content item, that said each entity that authored the particular content item provided feedback;
determining to not include the feedback provided by said each entity when determining the level of engagement.

10. The system of claim 1, wherein identifying the one or more content items that corresponds to the first topic comprises determining, from metadata associated with the one or more content items, that each content item of the one or more content items corresponds to the first topic.

11. The system of claim 10, wherein the metadata comprises one or more tags associated with the one or more content items specified by an author entity of said each content item.

12. The system of claim 1, wherein the value that indicates sentiment of said each entity relative to the first topic is one of at least a positive, a neutral, or a negative sentiment.

13. The system of claim 1, wherein none of the entities of the second plurality of entities is a member of the first plurality of entities.

14. A method comprising:
receiving a selection of a first topic to which a content item may pertain;
for each entity of a first plurality of entities:
identifying one or more content items that were authored by said each entity and that corresponds to the first topic;
for each content item in the one or more content items:
generating a value that indicates sentiment of said each entity relative to the first topic;
determining a level of engagement of said each content item by a second plurality of entities;
based on the value and the level of engagement, generating an ambassador score for said each entity in the first plurality of entities;
wherein the method is performed by one or more computing devices.

15. The method of claim 14, wherein determining the level of engagement comprises:
for a plurality of feedback associated with each said each content item, determining the feedback comprises a text portion;
for each feedback of the plurality of feedback, analyzing the text portion of said feedback to determine whether the text portion corresponds to at least one of a positive feedback indicator, a negative feedback indicator, or a neutral feedback indicator;
determining the level of engagement based at least in part on the determined positive feedback indicator, negative feedback indicator, or the neutral feedback indicator for each feedback of the plurality of feedback.

16. The method of claim 14, wherein determining the level of engagement comprises:
for a plurality of feedback associated with each said each content item, determining the level of engagement based at least in part on a number of feedback of the plurality of feedback.

17. One or more storage media storing instructions which, when executed by one or more processors, cause:
receiving a selection of a first topic to which a content item may pertain;
for each entity of a first plurality of entities:
identifying one or more content items that were authored by said each entity and that corresponds to the first topic;
for each content item in the one or more content items:
generating a value that indicates sentiment of said each entity relative to the first topic;
determining a level of engagement of said each content item by a second plurality of entities;
based on the value and the level of engagement, generating an ambassador score for said each entity in the first plurality of entities.

18. The method of claim 14, wherein identifying the one or more content items comprises, for a first entity of the first plurality of entities, identifying two or more content items that were authored by the first entity.

19. The one or more storage media storing instructions of claim 18, wherein determining the level of engagement comprises:
for a plurality of feedback associated with each said each content item, determining the level of engagement based at least in part on whether a feedback indicator comprises a positive feedback indicator or a negative feedback indicator.

20. The one or more storage media storing instructions of claim 18, further comprising:
receiving a selection of a second topic to which a content item may pertain;
for each entity of the first plurality of entities:
identifying one or more second content items that were authored by said each entity and that corresponds to the second topic;
for each content item in the one or more second content items:
generating another value that indicates sentiment of said each entity relative to the second topic;
determining another level of engagement of said each content item by a third plurality of entities that is different than the second plurality of entities;

based on the other value and the other level of engagement, generating another score for said each entity in the first plurality of entities.

\* \* \* \* \*